US010648712B1

(12) United States Patent
Dev et al.

(10) Patent No.: US 10,648,712 B1
(45) Date of Patent: May 12, 2020

(54) MICROWAVE ASSISTED HYBRID SOLAR VAPOR ABSORPTION REFRIGERATION SYSTEMS

(71) Applicant: Florida A&M University, Tallahassee, FL (US)

(72) Inventors: Satyanarayan Dev, Tallahassee, FL (US); Charles Magee, Cairo, GA (US)

(73) Assignee: Florida A&M University, Tallahassee, FL (US)

( * ) Notice: Subject to any disclaimer, the term of this patent is extended or adjusted under 35 U.S.C. 154(b) by 40 days.

(21) Appl. No.: 15/998,763

(22) Filed: Aug. 16, 2018

Related U.S. Application Data

(60) Provisional application No. 62/546,205, filed on Aug. 16, 2017.

(51) Int. Cl.
*F25B 27/00* (2006.01)
*B60H 1/32* (2006.01)

(52) U.S. Cl.
CPC ......... *F25B 27/007* (2013.01); *B60H 1/3201* (2013.01)

(58) Field of Classification Search
CPC ............................ F25B 27/007; B60H 1/3201
See application file for complete search history.

(56) References Cited

U.S. PATENT DOCUMENTS

| 4,031,712 | A | 6/1977 | Costello | |
|---|---|---|---|---|
| 4,100,755 | A | 7/1978 | Leonard | |
| 4,171,619 | A * | 10/1979 | Clark | F25B 25/02 62/235.1 |
| 4,178,989 | A * | 12/1979 | Takeshita | F24D 11/0221 165/62 |
| 4,223,535 | A | 9/1980 | Kumm | |
| 4,285,211 | A * | 8/1981 | Clark | F25B 25/02 62/335 |
| 8,881,539 | B1 | 11/2014 | El-Shaarawi et al. | |
| 9,488,394 | B1 * | 11/2016 | El-Shaarawi | F25B 27/007 |

(Continued)

FOREIGN PATENT DOCUMENTS

| EP | 0836060 A2 | 4/1998 |
|---|---|---|
| EP | 1688685 A1 | 8/2006 |

(Continued)

*Primary Examiner* — Kun Kai Ma
(74) *Attorney, Agent, or Firm* — Smith & Hopen, P.A.; Steven M. Forte

(57) ABSTRACT

A microwave-assisted hybrid solar vapor absorption system that converts anergy into exergy and works sustainably without the intermittence associated with the single absorption vapor absorption systems. The heat required for the generator in a vapor absorption system is provided by preheating the water through solar collectors and by using the vehicle's waste heat in conjunction with solar heat, collecting the waste heat and the solar heat into circulating water or other thermal fluids like mineral oil through the vehicle's radiator, the vehicle's exhaust pipe, and a solar collector. By combining the waste heat and the solar heat, the system achieves the required generator temperature. By introducing dielectric heating and by differentially heating only the refrigerant fluid, and not the absorbent fluid, the required pressure for refrigeration is achieved, while allowing the absorbent fluid to remain significantly cooler than the refrigerant. This increases the Coefficient of Performance to 0.95.

17 Claims, 12 Drawing Sheets

(56) References Cited

U.S. PATENT DOCUMENTS

| 9,702,597 | B1* | 7/2017 | El-Shaarawi | F25B 27/007 |
|---|---|---|---|---|
| 2005/0050913 | A1 | 3/2005 | Barth et al. | |
| 2005/0126211 | A1* | 6/2005 | Drost | F25B 15/02 |
| | | | | 62/476 |
| 2006/0197053 | A1* | 9/2006 | Shiflett | C09K 5/047 |
| | | | | 252/67 |
| 2007/0019708 | A1* | 1/2007 | Shiflett | F25B 25/02 |
| | | | | 374/181 |
| 2007/0276103 | A1 | 11/2007 | Guerra et al. | |
| 2012/0285189 | A1* | 11/2012 | Takeda | F01K 3/24 |
| | | | | 62/235.1 |
| 2017/0130998 | A1* | 5/2017 | El-Shaarawi | F25B 15/06 |
| 2019/0161366 | A1* | 5/2019 | Al-Azazmeh | C02F 1/14 |

FOREIGN PATENT DOCUMENTS

| EP | 1495271 B1 | 2/2007 |
| FR | 2689220 A1 | 10/1993 |
| JP | 2006183959 A | 7/2006 |
| JP | 2008267696 A | 11/2008 |
| WO | 2006084262 A1 | 8/2006 |
| WO | 2006094304 A2 | 9/2006 |
| WO | 2006110944 A1 | 10/2006 |
| WO | 2006137930 A3 | 12/2006 |
| WO | 2007082103 A2 | 7/2007 |

* cited by examiner

Required surface area = $0.068\ m^2\ (0.73\ ft^2)$

MICROWAVE ASSISTED HYBRID SOLAR VAPOR ABSORPTION REFRIGERATION SYSTEMS

CROSS-REFERENCE TO RELATED APPLICATIONS

This nonprovisional application claims priority to U.S. Provisional Patent Application No. 62/546,205, entitled "Microwave Assisted Portable Solar Vapor Absorption Refrigeration Systems for Sustainable Cold Chain," filed Aug. 16, 2017 by the same inventors, the entirety of which is incorporated herein by reference.

TECHNICAL FIELD OF THE INVENTION

This disclosure relates, generally, to hybrid refrigeration and air conditioning using vapor absorption systems utilizing waste heat and solar power.

BACKGROUND OF THE INVENTION

Under the laws of thermodynamics, the total energy consumed to perform any work can be generally defined as exergy (the energy, which is available to perform the actual work) and anergy (wasted and effectively has no capacity to perform work). The exergy of a system is the maximum useful work possible during a process that brings the system into equilibrium with a heat reservoir. Exergy is the energy that is available to be used. After the system and the surroundings reach equilibrium, the exergy is zero. An example of such energy is automobile exhaust heat that is ejected to the atmosphere. Energy is neither created nor destroyed during a process, it simply changes from one form to another. In contrast, exergy is always destroyed when a process is irreversible. This destruction is proportional to the entropy increase of the system together with its surroundings. The destroyed exergy has been called anergy. If this anergy is captured and is used to perform other useful work, the exergy efficiency of the system will improve significantly.

However, this capture and use of anergy is still inefficient. The American economy wastes 86% of all the energy used per year in the production of goods and services. One can easily imagine that waste of this magnitude creates an array of costs that weakens the nation's economic and social well-being. If this exergy can be improved even from about 14% to about 20%, it could lead to a $2.3 trillion addition to the economy. One type of waste is food loss. The overall food loss in the United States is estimated to be $161.6 billion and nearly 40% of it comes from improper handling, storage, and transportation problems.

Attempts have been made to alleviate current issues with refrigeration transportation systems. Examples include U.S. Pat. No. 8,881,539; EP149527B1, EP1495271, EP1688685A1, JP162104A2, US20077201017, US200690197053A1, WO06084262A1, US20070019708A1, WO06094304A3, WO06110944A1, WO06137930A3, US20050126211A1, US20077171824, and EP0836060B1. However, none are sufficiently effective.

U.S. Pat. No. 6,374,630 for "Carbon dioxide absorption heat pump" to Jones discloses a traditional absorption cycle utilizing supercritical carbon dioxide. The '630 patent does not teach an absorber having either a very low vapor pressure, a boiling point less than 50° C., or any means to achieve a coefficient of performance better than 0.70. The '630 patent further does not teach any nonthermal means to reduce desorption temperature, nor the extraction of expansion energy.

United States Patent Application No. US 2003/0182946 for "Method and apparatus for using magnetic fields for enhancing heat pump and refrigeration equipment performance" to Sami et al. utilizes a magnetic field that is operable to disrupt intermolecular forces and weaken intermolecular attraction to enhance expansion of the working fluid to the vapor phase. Magnetic field energy has been found to alter the polarity of refrigerant molecules and disrupt intermolecular Van der Waals dispersion forces between refrigerant molecules, though Sami et al. does not teach the utilization of a magnetic field to reduce desorption energy.

United States Patent Application No. US 2002/0078696 for "Hybrid heat pump" and U.S. Pat. No. 6,539,728 for "Hybrid heat pump," both to Korin, disclose a hybrid heat pump system that includes (i) a membrane permeator having a permselective membrane capable of selectively removing vapor from a vapor-containing gas to yield a dry gas, and (ii) a heat pump having (a) an internal side for exchanging thermal energy with a process fluid, (b) an external side for exchanging thermal energy with an external environment, and (c) a thermodynamic mechanism for pumping thermal energy between the internal side and the external side in either direction. Korin uses membranes to pre-condition air in conjunction with a refrigeration air conditioning system, and does not perform or teach any phase separation within the refrigerant itself. Furthermore, although membranes have been used in various separation applications, their use for heat pump systems has been limited.

U.S. Pat. Nos. 4,152,901 and 5,873,260 propose to improve an absorption heat pump by using of a semipermeable membrane and pervaporation membrane, respectively. U.S. Pat. No. 4,467,621 proposes to improve vacuum refrigeration by using sintered metal porous membrane, and U.S. Pat. No. 5,946,931 describes a cooling evaporative apparatus using a microporous PTFE membrane. These patents do not teach the use of membranes for phase separation within an absorption system, but rather within adsorption systems.

U.S. Pat. No. 4,152,901 to Munters discloses a method and apparatus for transferring energy in an absorption heating and cooling system where the absorbent is separated from the working medium by diffusing the mixture under pressure through a semi-permeable membrane defining a zone of relatively high pressure and a zone of relatively low pressure, higher than the ambient pressure.

U.S. Pat. No. 5,873,260 for "Refrigeration apparatus and method" to Linhardt, et al. utilizes the increased pressure of the absorbent/refrigerant solution that is then supplied to a pervaporation membrane separator to provide as one output stream a vapor-rich refrigerant, and as another output stream a concentrated liquid absorbent. The '260 patent does not teach supercritical fluids.

U.S. Pat. No. 6,918,254 for "Superheater capillary two-phase thermodynamic power conversion cycle system" to Baker discloses a two-phase thermodynamic power system including a capillary device, vapor accumulator, superheater, an inline turbine, a condenser, a liquid pump and a liquid preheater for generating output power as a generator through the generation of a staggered or pulsed release of vapor flow. The capillary device, such as a loop heat pipe or a capillary pumped loop, is coupled to a vapor accumulator, superheater, the inline turbine for generating output power for power generation, liquid pump and liquid preheater. The capillary device receives input heat that is used to change phase of liquid received from the liquid preheater, liquid pump and condenser into vapor for extra heating in the superheater used to then drive the turbine. A superheater in combination with a liquid pump and preheater are implemented for use with the evaporator for improved thermal efficiency while operating at maximum cycle temperatures well below other available power conversion cycles.

U.S. Pat. No. 5,899,067 for "Hydraulic engine powered by introduction and removal of heat from a working fluid" to Hageman discloses a thermal source as a means to increase a working fluid's pressure which in turn drives a piston for pumping, or alternatively refers to the piston being connected to a generator to result in electricity.

International Patent Application No. WO2007082103 to Gurin discloses a safe, environmentally friendly absorptive cooling, heating, and energy generation process is provided. Gurin uses a carbon dioxide absorption cycle that utilizes a liquid, non-toxic absorbent such as ionic liquids, from which the carbon dioxide gas is absorbed. Only the carbon dioxide refrigerant is circulated to the evaporator and condenser heat exchangers, the components directly in contact with breathable air. The further incorporation of a thermodynamic hydraulic pump increases the energy efficiency, especially in combustion power generation cycles, as it eliminates a substantial portion of energy utilized for compression prior to combustion.

U.S. Pat. No. 4,031,712 to Costello discloses one or two compressors added to a conventional absorption-refrigeration system. The compressor may be added so as to provide for compressing the vapor refrigerant from the evaporator of the refrigeration system before introducing it into the absorber or a compressor may be added so as to provide for compressing the vapor refrigerant from the generator of the refrigeration system before introducing it into the condenser. The preferred modification includes compressors added at both points. The Costello system permits a balance between the amount of energy supplied thermally from the solar collector and the amount of energy supplied by electricity to compress the refrigerant vapor.

Another approach to solar energy powered cooling has been the co-called Rankine-cycle solar air conditioner. A Rankine cycle refers to the successive compression, heating, expansion, and condensation of a working fluid in a heat engine, such as a steam engine. The cycle may either be closed, where the working fluid is recycled, or open, where the expanded and condensing steam is simply vented to the air. In the Rankine cycle solar air conditioner, solar heated hot water at 215° F. (102° C.) from solar panels enters a multiple stage boiler where a working fluid of a liquid refrigerant, R-113 (trichlorotrifluoroethane) is vaporized and used to turn a small turbine. The expanded refrigerant is cooled, condensed and pump returned to the boiler. The turbine is used to drive a compressor in a conventional vapor compression refrigeration system.

In a conventional vapor compression refrigeration system, a refrigerant, which is a compressible, condensable gas, is compressed in a compressor, passed to a condenser where the gas is condensed to a liquid, and passed through an expansion device to a low-pressure evaporator, where evaporation and cooling take place. The compressor in the Rankine cycle solar vapor compression system is driven either by the turbine or by a back-up electric motor.

U.S. Pat. No. 4,100,755 to Leonard describes an absorption refrigeration system suitably arranged for utilizing solar energy as a primary source of power to the system generator. Leonard describes the use of any other source of low temperature energy, such as normally unrecovered heat energy produced by many manufacturing processes or geothermal sources can be employed in a similar manner. Leonard also describes an absorption system employing water as a refrigerant and lithium bromide as an absorbtive solution.

U.S. Pat. No. 4,178,989 to Takeshita et al. describes a system to accomplish both air cooling and air heating of indoor space by utilizing solar energy. In principle the disclosed system is an absorption refrigeration system, wherein a solution of an evaporable refrigerant in a less evaporable solvent is passed through a solar collector-generator, but the system has additional fluid passages with the provision of changeover valves arranged so as to pass the refrigerant in heated and vaporized state from the collector-generator to an indoor heat exchanger, bypassing the condenser of the refrigerator, thereby to accomplish air heating and return the refrigerant in liquid state from the heat exchanger to the collector-generator, bypassing the absorber of the refrigerator.

In solar heating and cooling systems, development of high efficiency collectors to collect heat from solar radiation is one of main technological tasks, and reduction of heat loss during the transfer of heat from a solar collector to other components is another important task. From a practical viewpoint, it is also important that the use of a solar system affords a fuel saving large enough to pay back initial investments to the solar system in a satisfactorily short time. In this regard, it is quite desirable that a solar system can accomplish both air heating and air cooling because then the amount of fuel or money saving per year can be increased.

The use of solar energy for air cooling or air conditioning is made almost always by means of either a vapor compression refrigerator or an absorption refrigerator. In the former case, hot water (or an organic heating medium) supplied from a solar collector is used to generate a high-pressure vapor of a refrigerant such as Freon, with which a Rankine cycle engine of the refrigerator is operated. A solar system of this type can operate with high efficiency only if use is made of a highly efficient solar collector since the thermal efficiency of the compression refrigerator is unsatisfactory and below than that of an absorption refrigerator when the temperature of the heating medium does not exceed about 100° C. In the case of an absorption refrigerator system in which usually water and lithium bromide are employed respectively as refrigerant and absorber, hot water (or an organic heating medium) provided by a solar collector serves as the heat source for operation of the refrigerator. This type of solar cooling system too requires that the heating medium is heated to a considerably high temperature. It is possible to use this type of system also as a solar heating system, but the temperature requirement to the heating medium for heating operation is almost like that for cooling operation. Since it is difficult to realize such a high temperature in winter, an absorption refrigerator system is rarely practiced as a solar heating system.

U.S. Pat. No. 4,373,347 to Howell et al. describes a hybrid absorption system utilizing a low grade thermal energy source which includes means for contacting process air with a liquid desiccant solution, first cooling means placed within the contacting means in heat exchange relation with the process air; means for absorbing the heat transferred by the first cooling means, means for mixing water and strong liquid desiccant, second cooling means placed in heat exchange relation with the mixing means; concentrating means utilizing low grade thermal energy to concentrate the desiccant solution from the contacting means and the mixing means, and condensing means for condensing water vapor received from the concentrating means. Howell et al. discloses a contacting means with an open absorber and is employed in conjunction with an absorption-refrigeration system such that the system comprises an open absorber using a liquid desiccant solution to absorb moisture from air passing therethrough, a cooling coil as a first cooling means positioned within the open absorber for cooling air passing through the open absorber, an absorber as mixing means for absorbing water vapor into the strong liquid desiccant solution, a generator as concentrating means to concentrate the desiccant solution received from the open absorber and the absorber, a condenser as condensing means for vapor driven off in the generator and an evaporator as means for absorbing the heat transferred from the process air to the cooling coil, said evaporator adapted to vaporize the condensed vapor from the condenser and allow transfer of the resultant vapor to the absorber.

International Patent Application No. WO2007082103 to Gurin discloses a multistage absorption heat pump system, also known as a cascading system, whereby one distinct refrigerant A is used in at least one distinct stage and at least one other distinct refrigerant B is used in at least one other distinct stage. Each stage is in effect a distinct thermodynamic cycle, though each stage is coupled to the other as one's output is the other's input. The Gurin high efficiency absorption heat pump device leverages the differences in desorption temperature of a refrigerant A and absorption temperature of refrigerant B. Yet another configuration disclosed in Gurin is the high efficiency absorption heat pump device having direct infusion of a parallel energy generation system or combustor such that its exhaust is infused into the absorber, capturing latent energy from the exhaust stream. Another Gurin implementation utilizes techniques to selectively enable the refrigerant to enter the absorber, thus the exhaust air is treated to remove byproducts. This implementation achieves concurrent carbon dioxide sequestration. The cooling available from the high efficiency absorption heat pump device is then utilized to precool the combustion air to increase turbine capacity and energy efficiency.

As is well known, refrigeration systems generally comprise either (a) a vapor compressor that compresses a gaseous refrigerant such as a fluorinated hydrocarbon, a condenser to condense the vapor to liquid form, an expansion valve to reduce the pressure of the liquid, and an evaporator to cool the air or water by evaporation of the refrigerant; or (b) an absorber containing an absorbent such as a solution of lithium bromide and water that absorbs the gaseous refrigerant such as water vapor, a pump that raises the pressure of the solution after absorption of the vapor, a generator in which the solution is heated to drive the refrigerant vapor off at high pressure, a condenser in which the high-pressure vapor is cooled until it condenses into liquid form, and expansion valve by which the liquid is brought to a lower pressure, and an evaporator to cool the air or water by evaporation of the refrigerant.

The disadvantage of the vapor compression system described under (a) above is that large amounts of electric power are required to compress the vapor, so operating expenses are high and a valuable energy resource is consumed. The disadvantage of the absorption system described in (b) above is that high temperatures are required to drive the refrigerant out of the solution in the generator. In addition, a highly efficient coolant such as cold water is required in the condenser and the absorber. The high temperatures of the generator are attained usually by combustion of fossil fuels, so operating expenses are high and a valuable energy resource is consumed. To attain these high temperatures using a renewable energy source such as solar energy, large, costly, and inefficient collector systems are required.

Accordingly, what is needed is a vapor absorption refrigeration system that results in high exergy efficiency. However, in view of the art considered as a whole at the time the present application was made, it was not obvious to those of ordinary skill in the field of this disclosure how the shortcomings in the art could be overcome.

While certain aspects of conventional technologies have been discussed to facilitate disclosure of the instant application, Applicants in no way disclaim these technical aspects, and it is contemplated that the claimed subject matter may encompass one or more of the conventional technical aspects discussed herein.

The present application may address one or more of the problems and deficiencies in the art discussed above. However, it is contemplated that the present application may prove useful in addressing other problems and deficiencies in a number of technical areas. Therefore, the claimed subject matter should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In volumentric heating applications of microwave and radiofrequency electromagnetic radiations, permittivity can be related to chemical composition, physical structure, frequency, and temperature, with moisture content being the dominant factor. Dielectric properties (dielectric contant—$\epsilon'$, dielectric loss factor—$\epsilon''$) are primarily determined by their chemical composition (presence of mobile ions and permanent dipole moments associated with water and other molecules) and, to a much lesser extent, by their physical structure. Power dissipation is directly related to the dielectric loss factor $\epsilon''$ and depends on the specific heat of the food, density of the material, and changes in moisture content (for example, vaporization).

Permittivity also depends on the frequency of the applied alternating electric field. Frequency contributes to the polarization of molecules such as water. In general, dielectric constant increases with temperature, whereas loss factor may either increase or decrease depending on the operating frequency. The heating uniformity and temperature elevation rate depends dielectric properties and thus differential volumentric heating can be achieved in mixtures.

SUMMARY OF THE INVENTION

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Embodiments disclosed herein include a high exergy efficient hybrid solar vapor absorption system, as well as related method of use.

For example, in accordance with one embodiment, a high exergy efficient hybrid solar vapor absorption system utilizing an evaporator, in which evaporation and cooling take place. A condenser, in which gas is condensed to a liquid. Furthermore, the evaporator and the condenser are in fluid communication with each other, and the system has a refrigerant and absorbent combination flowing throughout. The system also has an expansion valve coupling together the evaporator and the condenser, which directs flow from the condenser to the evaporator. The system also contains a thermal compressor in fluid communication with the evaporator and the condenser. The thermal compressor directs flow from the evaporator to the condenser, and it contains a generator ($Q_{in}$) that receives solar energy, an absorber ($Q_{out}$), a heat source that directs heat from the generator to the absorber, and a pump ($W_{in}$) that directs work from the absorber to the generator.

The heat required for the generator can be provided by preheating water through solar collectors by using waste heat in conjunction with solar heat.

The water is circulated through a vehicle radiator, a vehicle exhaust pipe, and/or a solar collector.

The system also utilizes dielectric volumetric heating using microwaves.

The refrigerant and the absorbent are differentially heated.

The refrigerant may be anyone of: R23; R32; R134a; R404A; R407A; R407C; R407F (PERFORMAX LT); R410A; and/or any microwave absorbing (i.e. high dielectric loss) fluids in combinations thereof.

The absorbent may be any microwave transparent (i.e low dielectric loss) fluid like bromobenzene.

The ratio of refrigerant to absorbent is dependant on the refrigerant chosen, the total heat availability and the refrigeration required. For example a ratio of 40:60 is ideal for R407C and bromobenzene for a 53 feet semi trailor with 65000 lbs of load hauled by a tractor with Detroit Diesel DD15 14.8-liter engine (560 hp).

The system may be portable.

The system produces at least 0.5 ton of refrigeration.

The waste heat energy is provided by vehicle exhaust.

The solar heat energy may provide an average of about 9.52 kWh/day.

The system may also have a heat storage tank, which may use thermal fluids including water.

The heat source tank is at least 7 gallons in volume.

The energy storage capacity is about 200 J/g on average.

The system may use two generators and two absorbers in fluid communication with each other and the condenser and the evaporator of the system.

In further embodiments, a method of increasing exergy efficiency in a solar absorption system using a high exergy efficient hybrid solar vapor absorption system. The system utilizing an evaporator, in which evaporation and cooling take place. A condenser, in which gas is condensed to a liquid. Furthermore, the evaporator and the condenser are in fluid communication with each other, and the system has a refrigerant and absorbent combination flowing throughout. The system also has an expansion valve coupling together the evaporator and the condenser, which directs flow from the condenser to the evaporator. The system also contains a thermal compressor in fluid communication with the evaporator and the condenser. The thermal compressor directs flow from the evaporator to the condenser, and it contains a generator ($Q_{in}$) that receives solar energy, an absorber ($Q_{out}$), a heat source that directs heat from the generator to the absorber, and a pump ($W_{in}$) that directs work from the absorber to the generator.

BRIEF DESCRIPTION OF THE DRAWINGS

For a fuller understanding of the instant application, reference should be made to the following detailed description, taken in connection with the accompanying drawings, in which.

DETAILED DESCRIPTION

Figure 1:
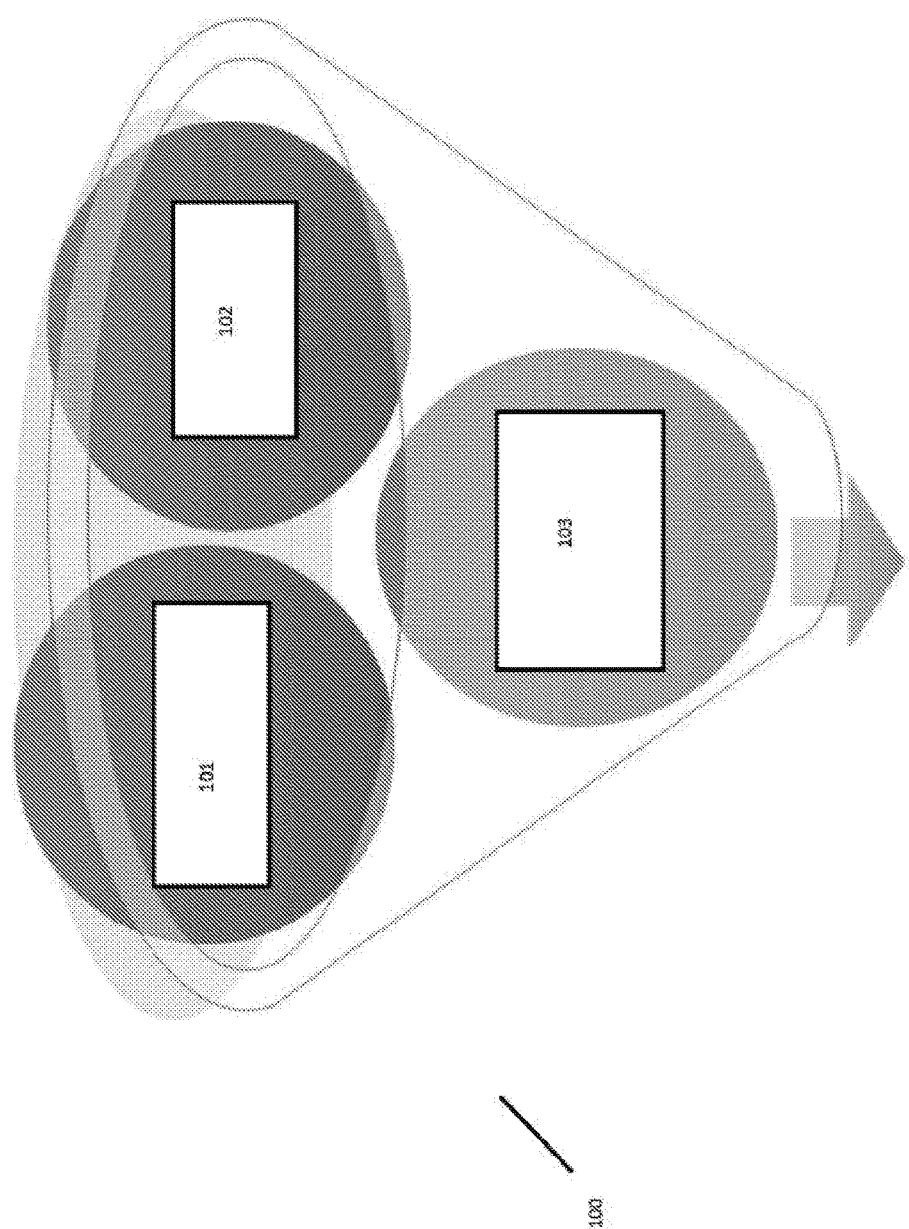
FIG. 1 depicts a flow diagram of benefits using microwave assisted hybrid solar vapor absorption refrigeration systems for sustainable cold chain, according to an embodiment of the claimed subject matter.

In the following detailed description, reference is made to the accompanying drawings, which form a part thereof, and within which are shown by way of illustration specific embodiments by which the claimed subject matter may be practiced. It is to be understood that other embodiments may be utilized and structural changes may be made without departing from the scope of the present application. These embodiments are described in sufficient detail to enable those of ordinary skill in the art to practice the present disclosure, and it is to be understood that other embodiments may be utilized, and that structural, logical, and electrical changes may be made within the scope of the disclosure.

From the following descriptions, it should be understood that components of the embodiments as generally described and illustrated in the figures herein could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. A person of ordinary skill in the art will understand that some process components are inherently disclosed herein and that adding various conventional process components and acts would be in accord with the disclosure. In this description, specific implementations are shown and described only as examples and should not be construed as the only way to implement the present disclosure unless specified otherwise herein.

Illustrations presented herein are not meant to be actual views of any particular material, component, or system, but are merely idealized representations that are employed to describe embodiments of the disclosure. Referring in general to the following description and accompanying drawings, various embodiments of the present disclosure are illustrated to show its structure and method of operation. Common elements of the illustrated embodiments may be designated with similar reference numerals. It should be understood that the figures presented are not meant to be illustrative of actual views of any particular portion of the actual structure or method, but are merely idealized representations employed to more clearly and fully depict the present disclosure defined by the claims below.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Any headings used herein should not be considered to limit the scope of embodiments of the disclosure as defined by the claims below and their legal equivalents. Concepts described in any specific heading are generally applicable in other sections throughout the entire specification.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The phrases "connected to" and "coupled to" refer to any form of interaction between two or more entities, including mechanical, electrical, magnetic, electromagnetic, fluid, and thermal interaction. Two components may be connected or coupled to each other even though they are not in direct contact with each other. For example, two components may be coupled to each other through an intermediate component.

Referring in general to the following description and accompanying drawings, various embodiments of the present disclosure are illustrated to show its structure and method of operation. Common elements of the illustrated embodiments may be designated with similar reference numerals. Accordingly, the relevant descriptions of such features apply equally to the features and related components among all the drawings. Any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method, but are merely idealized representations employed to more clearly and fully depict the present disclosure defined by the claims below.

All referenced publications are incorporated herein by reference in their entirety.

Furthermore, where a definition or use of a term in a reference, which is incorporated by reference herein, is inconsistent or contrary to the definition of that term provided herein, the definition of that term provided herein applies and the definition of that term in the reference does not apply.

A heat pump is a device for delivering heat or cooling to a system, whereas a refrigerator is a device for removing heat from a system. Thus, a refrigerator may be considered a type of a heat pump. Throughout the specification, reference is made to a heat pump with the understanding that the designation of refrigerator, air conditioner, water heater, cogeneration system (also referred to as combined heat and power or CHP system, which is the use of a heat engine or a power station to simultaneously generate both electricity and useful heat), and tri generation system (a cogeneration system that additionally produces cooling) could be substituted without changing the operation of the device. The inherent feature of a heat pump is to transport/move thermal energy from a heat source to a heat sink. The use of the term heat pump, thus is broadly applied as the transport of thermal energy from one enthalpy/entropy state to another. Thus, the utilization of heat pumps is not restricted to the generation of heating or cooling, but also for the intrinsic movement of thermal energy in virtually any thermodynamic cycle including means to convert such thermal energy into power generation (e.g., electrical or mechanical energy).

One type of a heat pump is an absorption heat pump. In absorption heat pumps, an absorbent such as water absorbs the refrigerant, typically ammonia, thus generating heat. When the combined solution, also referred to as binary solutions, is pressurized and heated further, the refrigerant is expelled. When the refrigerant is pre-cooled and expanded to a low pressure, it provides cooling. The low-pressure refrigerant is then combined with the low pressure depleted solution to complete the cycle.

The term "absorption" is widely accepted in the application of heat pumps for cooling.

Absorption, in chemistry, is a physical or chemical phenomenon or a process in which atoms, molecules, or ions enter some bulk phase—gas, liquid or solid material. This is a different process from adsorption, since the molecules are taken up by the volume, not by surface. A more general term is sorption which covers adsorption, absorption, and ion exchange.

The term "solar energy" is defined as energy derived from the sun, which most often refers to the direct conversion of radiated photons into electrons or phonons through a wide range of means. Solar energy is also indirectly converted into additional energy forms such as the heating of ground water (a.k.a. geothermal water).

The term "supercritical" is defined as the point at which fluids have been exploited above their critical temperatures and pressures.

The term "heat pump" is defined as the transport of thermal energy extracted from a heat source to a heat sink by means including vapor compression, absorption, and adsorption.

It is an object of the instant application to provide a hybrid, portable, solar vapor absorption refrigeration system that ensures sustainable, clean, and refrigerated transportation with high exergy efficiency. The claimed subject matter can save $17-$30 per 100 miles of refrigerated transportation depending on prevailing oil prices, reduce greenhouse gas emissions by up to 200 tons of $CO_2$ equivalence, reduce dependency on fossil fuels for refrigerated transportation, and provide technology that is scalable for cold storage and air-conditioning of buildings.

The claimed subject matter maximize exergy efficiency by using the automobile exhaust heat for refrigeration with supplementary heat from solar collectors and dielectric volumetric heating using microwaves or radiofrequency waves. This results in the refrigerated transport process being environmentally and operationally self-sustainable. This will add to the existing knowledge-base of thermodynamics and heat transfer while enhancing curriculum development in refrigeration and air-conditioning. The current disclosure solves the problems discussed above, specifically issues with energy efficiency, environmental sustainability, and food security, as depicted in FIG. 1. In FIG. 1, 100 is the microwave assisted hybrid solar vapor absorption systems for sustainable cold chain food delivery. Environmental sustainability is depicted as 101, energy efficiency is depicted as 102, both leading to food security 103.

As discussed above, in a conventional vapor compression refrigeration system, a refrigerant, which is a compressible, condensable gas, is compressed in a compressor, passed to a condenser where the gas is condensed to a liquid, and passed through an expansion device to a low-pressure evaporator, where evaporation and cooling take place. The compressor in the Rankine cycle solar vapor compression system is driven either by the turbine or by a back-up electric motor.

The claimed subject matter is a hybrid microwave-assisted solar vapor absorption system that converts anergy into exergy and works sustainably without the intermittence associated with the single absorption vapor absorption systems. The heat required for the generator in a vapor absorption system can be provided by preheating the water or other thermal fluids through solar collectors and by using the vehicle's waste heat in conjunction with solar heat, collecting them into circulating water through the vehicle's radiator, the vehicle's exhaust pipe, and a solar collector. This achieves the required generator temperature. By introducing dielectric heating and by differentially heating only the refrigerant fluid and not the absorbent fluid, the required pressure can be achieved, while allowing the absorbent fluid to stay cooler.

In addition, the claimed subject matter provides for a magnetron to provide microwave heating which increases the pressure of the refrigerant. In some embodiments the microwave can increase the temperature of the refrigerant by a thousand fold which will result in an increased pressure of about six-hundred fold or more. The magnetron will use a transverse mode of electromagnetic radiation which is a particular electromagnetic field pattern of radiation measured in a plane perpendicular to the propagation direction of the beam. In some embodiments the waveguide mode of the transverse electromagnetic modes is $TE_{10}$. In some embodiments the microwave heating is directed to the generator in the solar vapor absorption refrigeration system.

Figure 2:
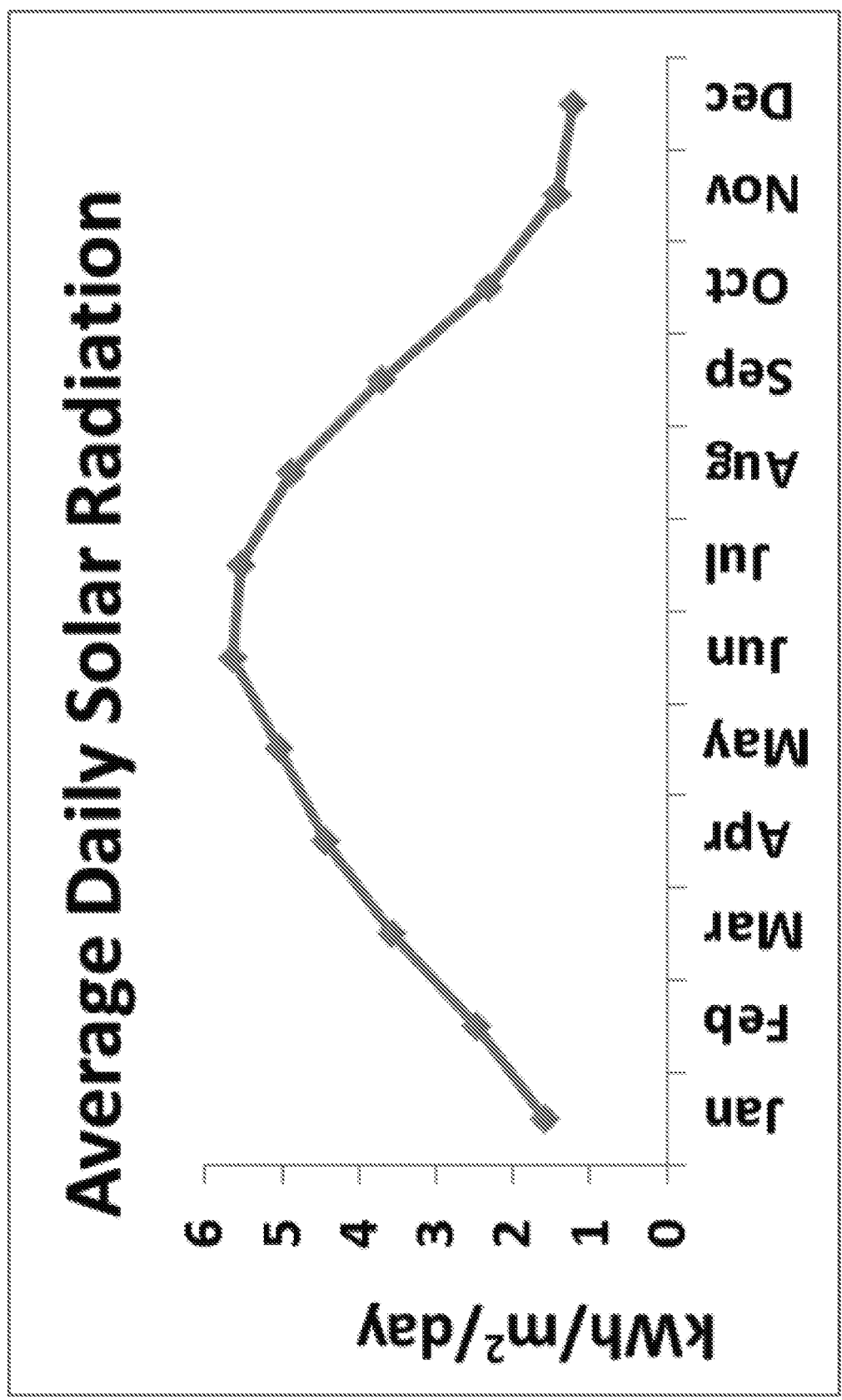
FIG. 2 is a graphical illustration depicting average solar radiation per day in the State of Florida versus energy generation.

FIG. 2 indicates the average solar radiation per day in the State of Florida. On average, a surface area of about 50 $m^2$ would be needed to capture enough sunlight to run the system on solar heat alone. A large amount of heat can be harvested from the vehicle engine's heat rejection system and its exhaust system.

Figure 3:
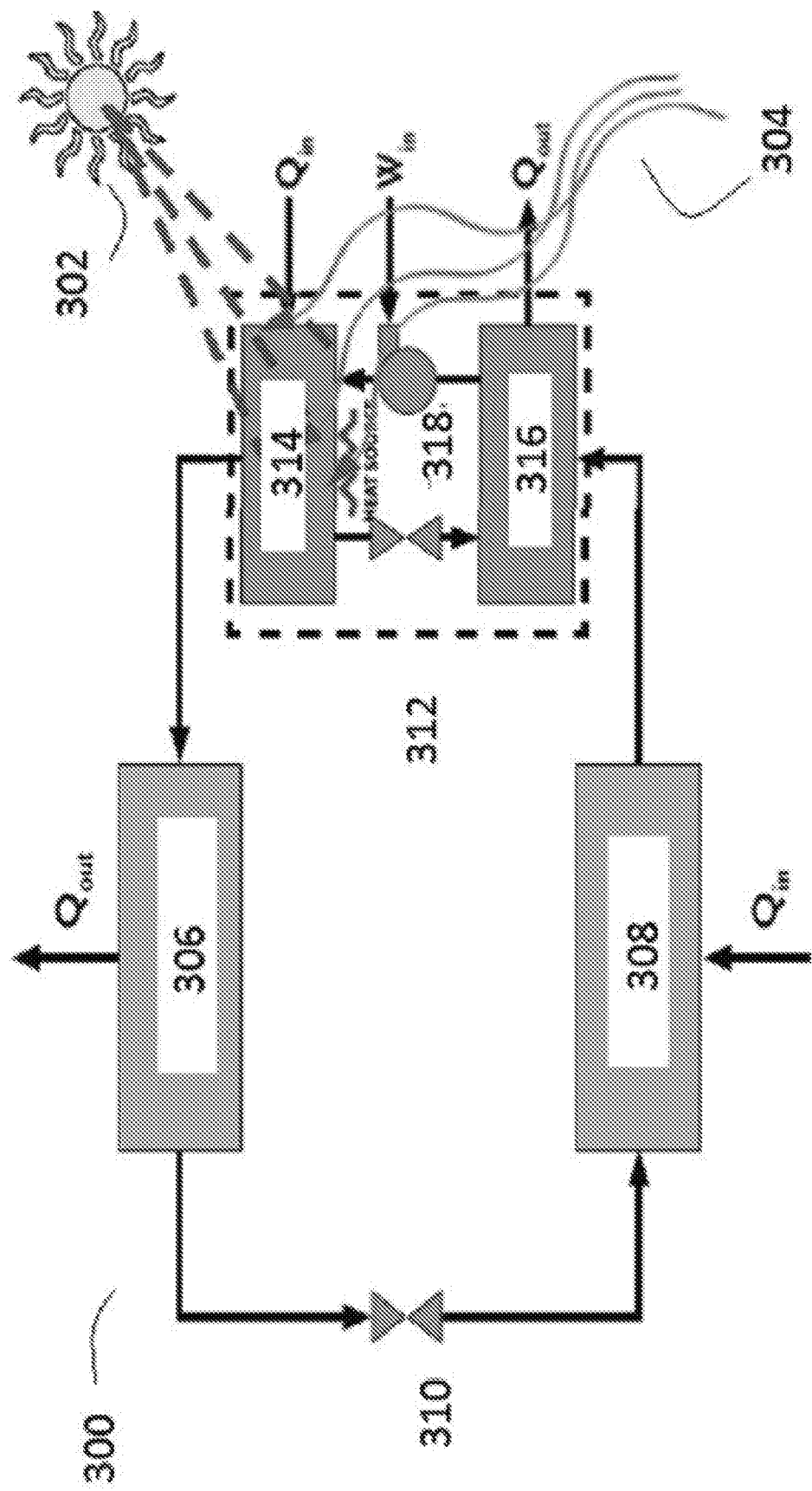
FIG. 3 is a schematic of an embodiment of the claimed subject matter.

The claimed subject matter integrates solar heat, automobile waste heat, and microwave heating to achieve a high exergy efficient hybrid solar vapor absorption system. An embodiment of the system is depicted in FIG. 3. The system is depicted as 300 with the solar energy 302 and microwaves 304 providing energy to the system. The system 300 further includes a condenser 306, evaporator 308, and an expansion valve 310 disposed between the condenser 306 and evaporator 308. The system 300 further includes a thermal compressor 312. Within thermal compressor 312 the system further includes a generator 314 in fluid communication with absorber 316. The thermal compressor 312 also includes a pump 318. Both the solar energy 302 and microwaves 304 increase heat in the generator 314. In some embodiments the microwaves 304 can provide heat to the system when there is no sun to provide solar energery 302. In some embodiments, another heat source, such as automobile exhaust (not depicted), can provide heat energy to the generator 314. In some embodiments a diesel engine is kept running to provide continuous heat from exhaust to the generator 314.

Figure 4A:
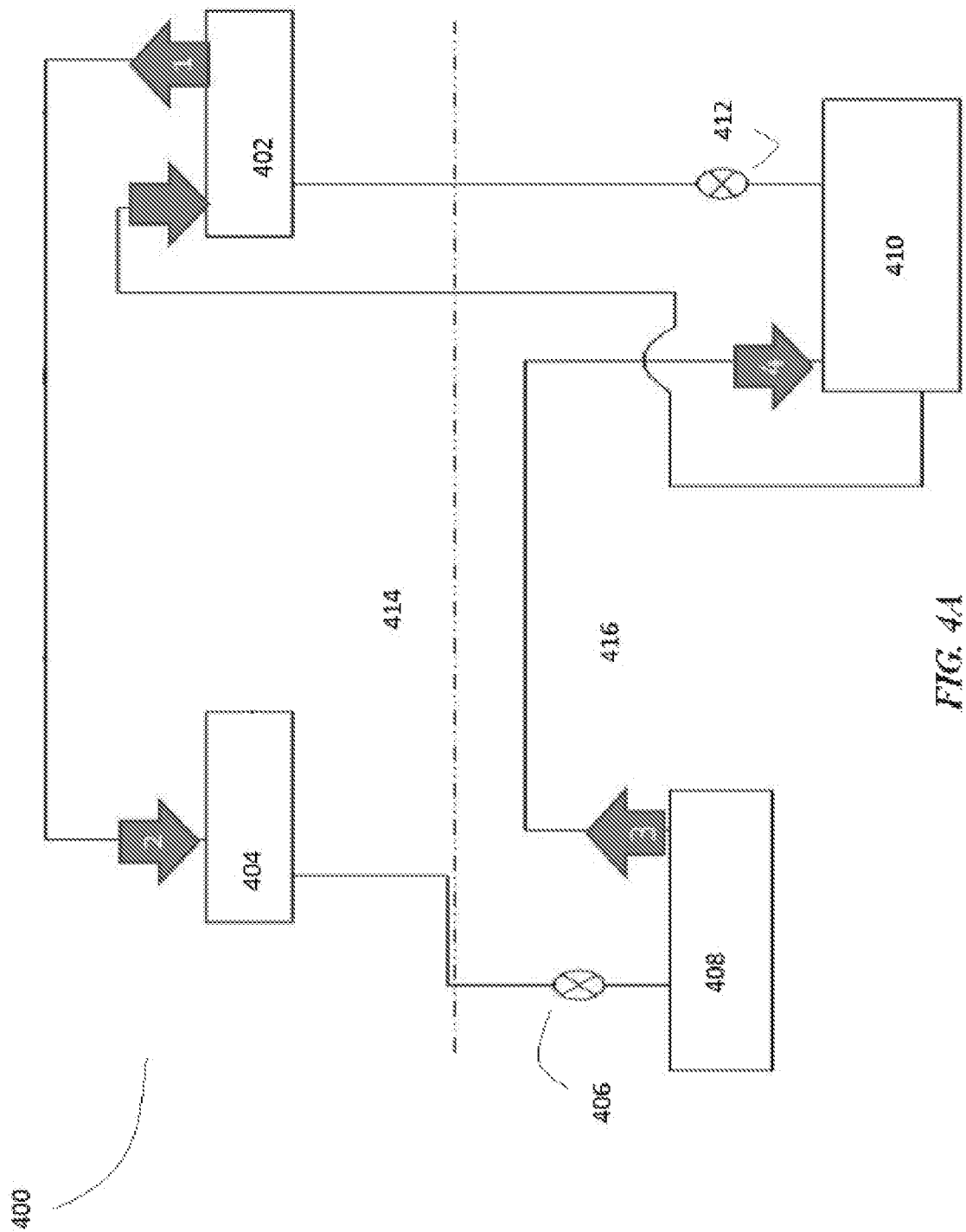
FIG. 4A is a schematic of a vapor absorption refrigeration cycle.
Figure 4B:
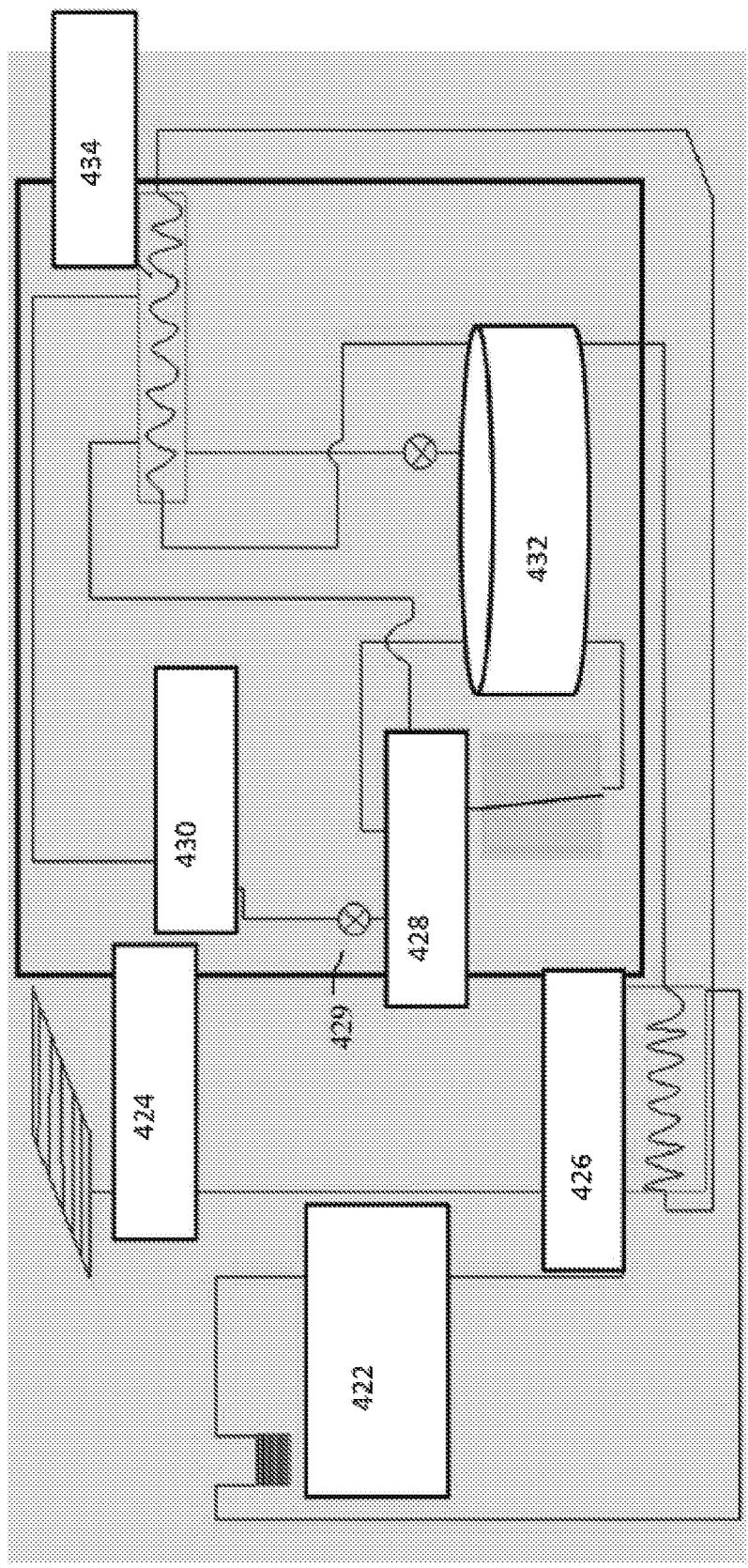
FIG. 4B is a schematic of a hybrid vapor absorption refrigeration cycle, according to an embodiment of the claimed subject matter.

FIGS. 4A and 4B are schematics of embodiments of vapor absorption refrigeration cycles. FIG. 4A depicts a vapor absorption refrigeration cycle 400. The cycle includes a generator 402, condenser 404, through a throttle valve 406, evaporator 408, absorber 410, and no-return valve 412. The system has a high pressure side 414, and low pressure side 416. The hybrid vapor absorption refrigeration cycle is depicted 420 in FIG. 4B. The cycle includes automobile waste heat 422, solar panels 424, storage unit 426, evaporator 428, condenser 430, absorbent tank 432, and generator 434.

Specifically, an embodiment of the system includes an evaporator 428 ($Q_{in}$) and a condenser 430 ($Q_{out}$) in fluid communication with each other, and coupled together via an expansion valve 429 that directs flow from the condenser 428 to the evaporator 430. A thermal compressor also communicates with the evaporator and the condenser and directs flow from the evaporator to the condenser. The thermal compressor includes a generator 402 ($Q_{in}$) that receives solar energy, an absorber 410 ($Q_{out}$), a heat source that directs heat from the generator to the absorber, and a pump 412 ($W_{in}$) that increases the pressure of the refrigerant and abosorbent solution from the absorber to the generator. In the schematic depicted an embodiment of the claimed subject matter in FIG. 4A depicting the system 400. The condenser 404 and generator 402 are on the high pressure side 414, while the evaporator 408 and absorber 410 are on the low pressure side 416. The throttle valve 406 is disposed between the evaporator 408 and condenser 404. A pressure change causes cooling in the system, while compression increases heat in the system.

In some embodiments, the system 420 includes the solar panels 424 and automobile waste heat 422 heat water that is stored in storage unit 426. This heated water is then used to direct heat to the generator 434. The evaporator 428 and absorbent tank 432 are linked in an absorbent fluid recirculation system. The evaporator 428 is linked via an expansion valve 429 to the condenser 430. There is a fail safe pressure valve (not depicted) disposed between the evaporator 428 and the generator 434, to ensure the system is protected from excess pressure build up.

The system also utilizes dielectric volumetric heating using microwaves. Microwave heating is a subcategory of dielectric heating at frequencies above 100 MHz, where an electromagnetic wave can be launched from a small dimension emitter and guided through space to the target. Microwave volumetric heating is used to heat liquids, suspensions, or solid in a continuous flow. Microwave volumetric heating has a greater penetration depth, of up to 42 millimetres (1.7 in), which is an even penetration through the entire volume of the flowing product. This is advantageous in commercial applications where increased shelf-life can be achieved, with increased microbial kill at temperatures 10-15° C. (18-27° F.) lower than when using conventional heating systems.

The refrigerant and the absorbent are differentially heated. Throughout the system the thermal fluids, including the refrigerant and the absorbent fluids, are heated differentially. In some embodiments the refrigerant is heated by different aspects of the claimed system including solar energy or waste heat. In some embodiments while the refrigerant is being heated the absorbent is not heated by the same sources in the claimed system, including solar energy or waste heat.

A combination of 40% ozone-friendly HFC Refrigerant R407c-ε'-32.8 and ε''-18.2 and 60% absorbent bromobenzene-ε'-2.0-ε''−0.2 was identified to be effective for a microwave-assisted vapor absorption cycle. Other suitable materials are contemplated herein as well. Other refrigerants contemplated in a non-limiting list: R23; R32; R134a; R404A; R407A; R407C; R407F (PERFORMAX LT); R410A; and/or combinations thereof.

P.A. HILTON refrigeration testing equipment was used to test the efficiency of refrigeration. Efficiency was found to be about 55%, which is comparable to any vapor compression cycle but without the need for a large compressor.

Example

Figure 5:
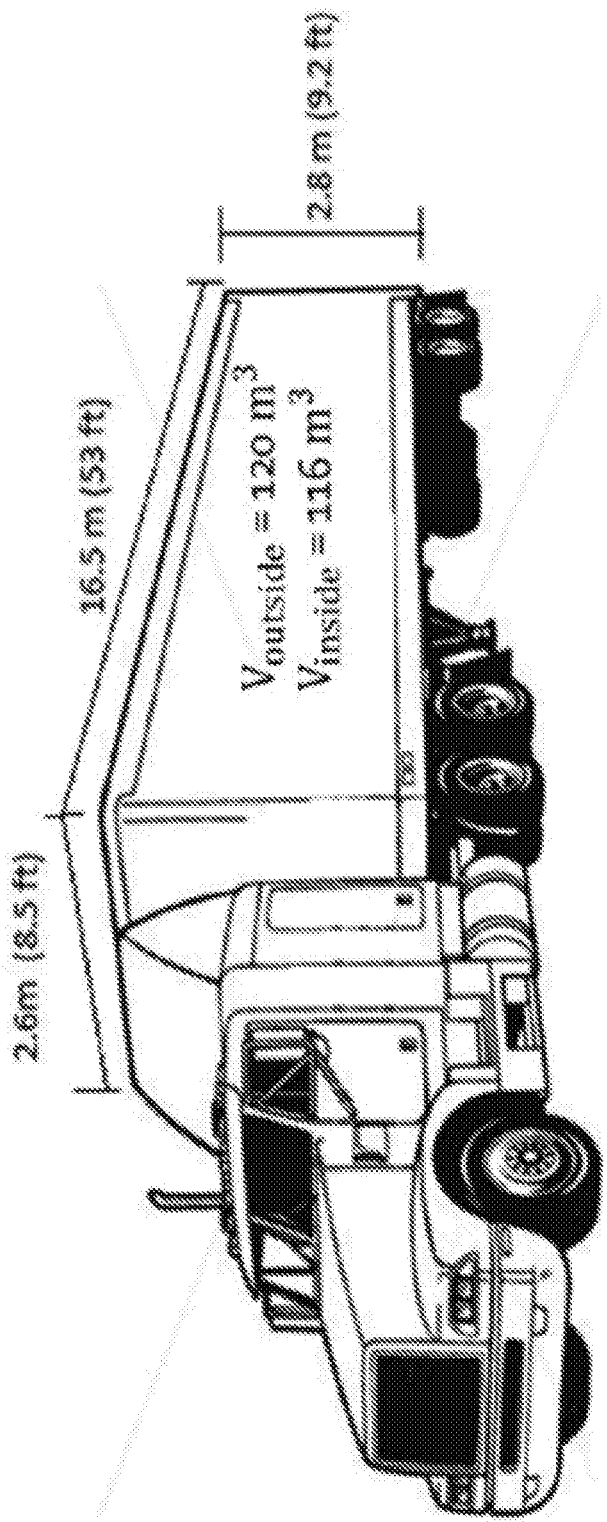
FIG. 5 depicts a semi-truck and stats thereof.

In a particular implementation, a hybrid refrigeration system for semi-trucks (see FIG. 5) to aid in the sustainability in the cold chain. FIG. 5 depicts a semi-truck body with dimensions of 2.6 m×16.5 m×2.8 m. The Volume outside is 120 m³ with an inside volume of 116 m³. FIG. 5 also lists the density of air at 25° C. to be 1.184 kg/m³. The specific heat capacity of air to be $C_p$ 1.005 kJ/kg° C. The mass of air inside the trailer is $m_{air}$ 137 kg. To determine cooling load, initial trailer temperature is 25° C., and desired trailer temperature is 5° C. The desired cooling time (t) is 2 hours (7200 seconds). With this information, the following can be seen:

Cooling Load of Empty Trailer $(Q_{Tr})=m_{air}C_p\Delta T$ $Q_{Tr_1}$=2,760.62 kJ $$\text{Power Needed } (P_{Tr}) = \frac{Q_{Tr}}{t}$$

$P_{Tr}$=383.5 Watts

The following is used in determining heat seepage through trailer walls:

| Material | Material Thickness (L) | Thermal Conductivity (k) | Thermal Resistances (R) |
|---|---|---|---|
| Aluminum | 10 mm | 205 $\frac{W}{m \cdot K}$ | $4.9 \times 10^{-5} \frac{m^2 K}{W}$ |
| Polystyrene | 305 mm | 0.02 $\frac{W}{m \cdot K}$ | 10.16 $\frac{m^2 K}{W}$ |
| Stainless-Steel | 10 mm | 16 $\frac{W}{m \cdot K}$ | $6.3 \times 10^{-5} \frac{m^2 K}{W}$ |

Conductance ($U$)

$$U = \frac{1}{R_{Total}} = 0.098 \frac{W}{m^2 K}$$

Heat Seepage in Empty Trailer $(q_{seep})=U \times A \times \Delta T$ $q_{seep}$=370 W Power Needed ($P_{seep}$)

$P_{seep}$=370 Watts

For example, to determine cooling load of lettuce, the following analysis is undertaken:

Initial Temperature of Lettuce=6° C.

Desired Temperature of Lettuce=5° C.

$$\text{Specific Heat Capacity of Lettuce Head} = 4.02 \frac{kJ}{kg \cdot ° C.}$$

In the U.S., 30,000 kg is the maximum legal load for a 53' semi-truck.

Cooling Load of Lettuce Heads $(Q_C)=m_{load}C_p\Delta T$ $Q_C$=120,600 kJ

Power Needed ($P_C$) for 4 hr cooling time $P_C$=8,375 Watts

Figure 6:
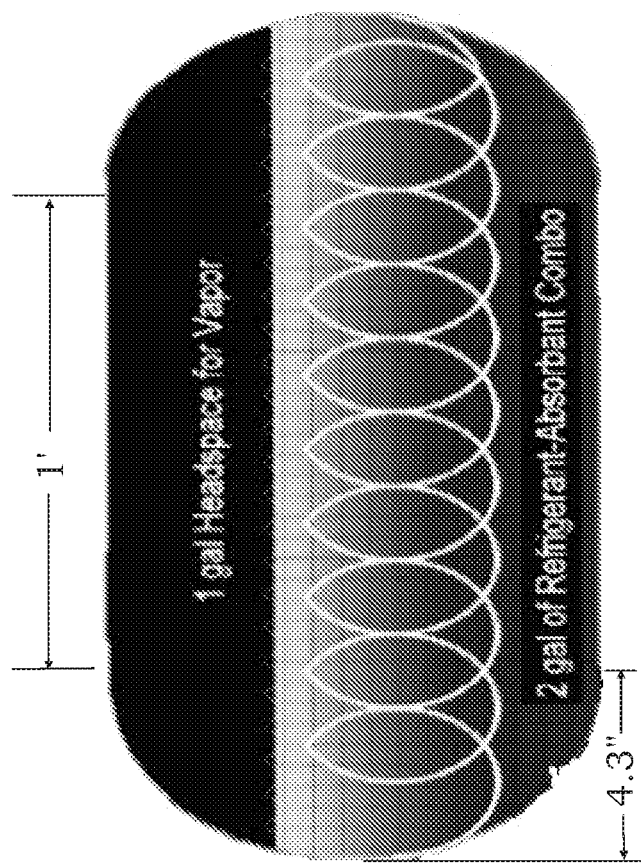
FIG. 6 depicts a generator as a component of the system, according to an embodiment of the claimed subject matter.
Figure 6:
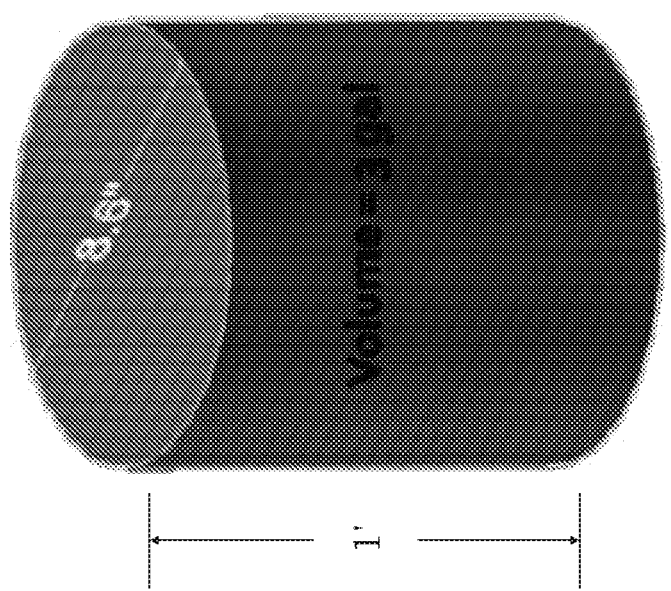

Respiration Rate (RR) of Lettuce Head = $20 \frac{\text{mg CO}_2}{\text{kg} \cdot \text{h}}$ Conversion Factor: $1 \frac{\text{mg CO}_2}{\text{kg} \cdot \text{h}} \times 10.639 = 1 \frac{J}{\text{kg} \cdot \text{h}}$ Heat of Respiration $(q_{RR}) = m \times RR$ $q_{RR} = 1773$ Watts Power Needed $(P_{RR})$ $P_{RR} = 1773$ Watts Max Power Needed to Cool $P_{Max} = P_C$ $P_{Total} = 8375$ Watts Component materials are based on ideal thermal properties. Sizes of components are based on cooling load determinations and constraints on truck dimensions. For example, sizing of a generator is based on cooling load, specific heat capacity of absorbent, and desired ΔT of 20° C. In some instances, a volume of 3 gallons is used. Sizing safety factor of 2.5 gallons is used, with headspace of 33% more than calculated volume accounted for. FIG. 6 depicts a cross-sectional view showing the 1 gallon volume headspace for vapor and 2 gallons of refrigerant-absorbent combination.

Figure 7:
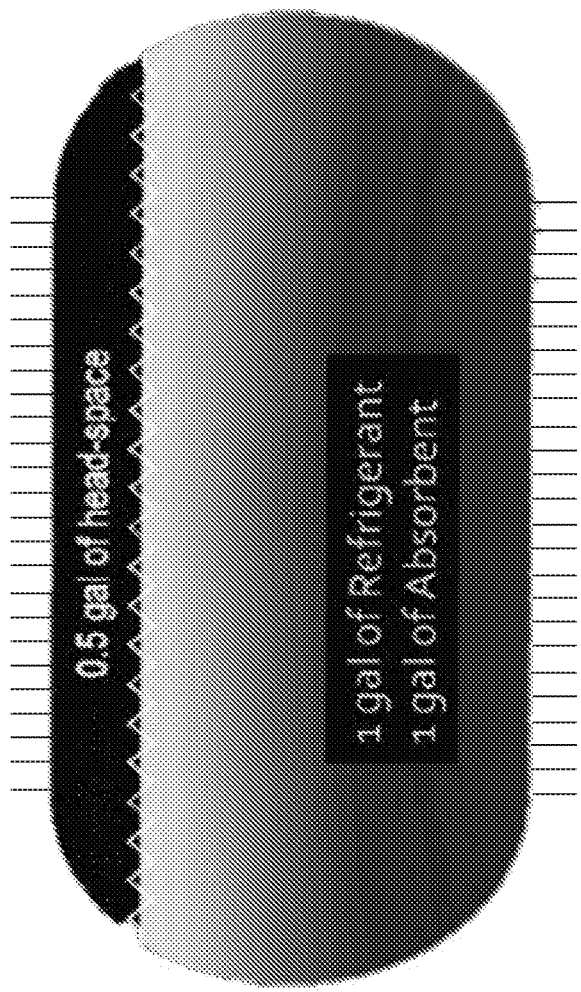
FIG. 7 depicts an absorbent tank as a component of the system, according to an embodiment of the claimed subject matter.
Figure 7:
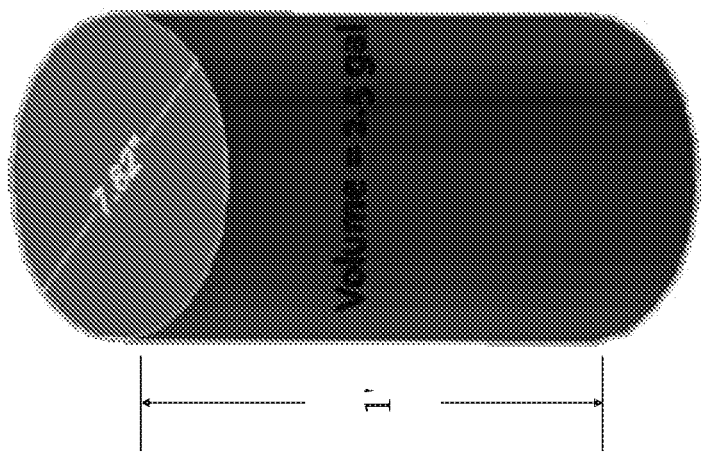

As another example, the size of absorbent tank is designed so the absorbent tank volume is close to generator volume. The following are its design constraints: volume of 2-3 gallons needed, headspace of 0.5-1 gallon needed, and height of tank fixed at 1 ft (0.328 m). FIG. 7 depicts this design, based on these constraints, with a volume of 2.5 gallons, there is 0.5 gallons of head-space, and 1 gallon of refrigerant mixed with 1 gallon of absorbent.

Using a refrigerant in combination, coupled with capillary tube selection, the system's effectiveness can be increased. In general, the refrigerating effect of R407C is less than that of R22, thus increasing the required mass flow for a given capacity. Capillary tubes selected for R22 applications may be used in the system. One of ordinary skill in the art will recognize other capillary tubes that can be used in the system. Change the system using industry acceptable charging methods with the proper amount of R407C. Generally, the system will use the same amount of refrigerant as R22. See the following analysis:

Refrigerant selection: R-407c

Absorbent selection: Bromobenzene

Absorbent volume: 1 gallon

Cooling load of lettuce: 2447.346 W

Refrigerant volume: 1 gallon

The primary energy source used by the current system is the recovered exhaust heat:

Calorific Value of Diesel = $44,800 \frac{kJ}{kg}$

Density of Diesel = $3.1495 \frac{kg}{gal}$

Power Collectable from Exhaust Heat $P = 391,938$ Watts

Assume 50% of Power Recovered $(P_{exhaust})$ $P_{exhaust} = 195,969$ Watts

Figure 8:
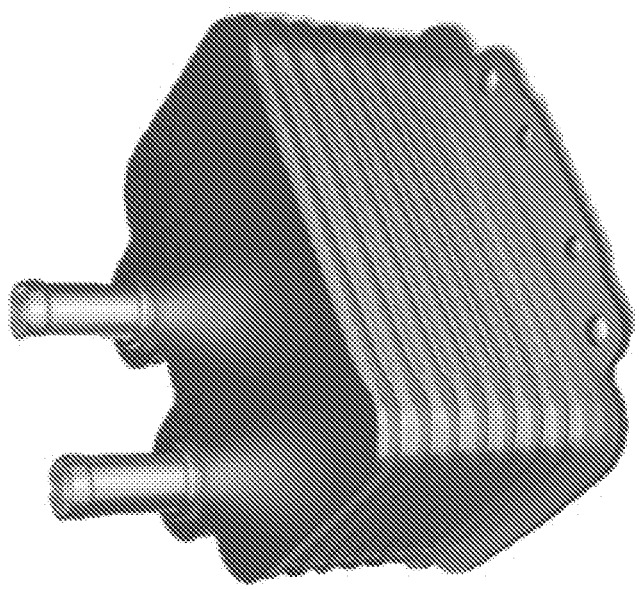
FIG. 8 depicts an exhaust heat exchanger as a component of the system, according to an embodiment of the claimed subject matter.
Figure 8:
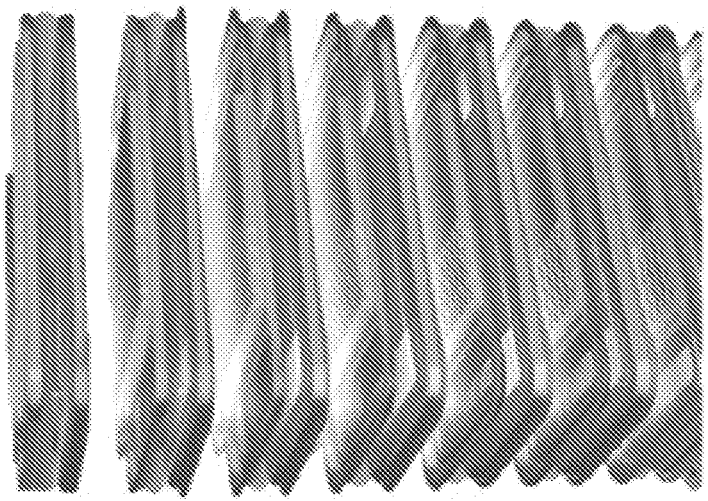

FIG. 8 depicts an example of an exhaust heat exchange with required surface area of 0.068 m².

Figure 9:
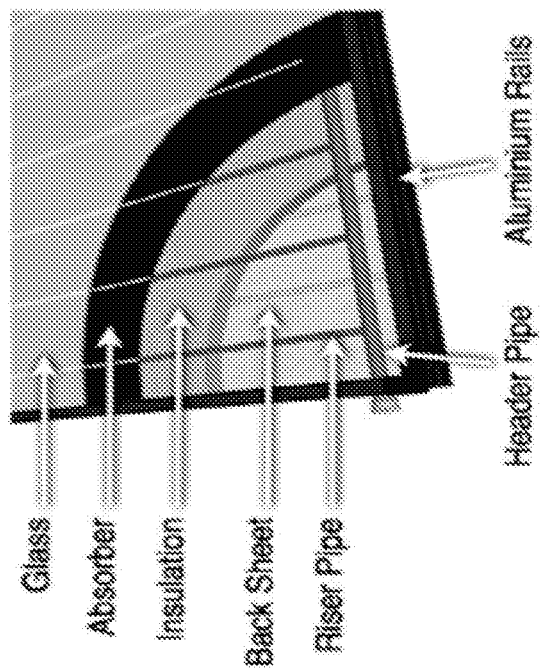
FIG. 9 depicts a solar panel apparatus as a component of the system, according to an embodiment of the claimed subject matter.
Figure 9:
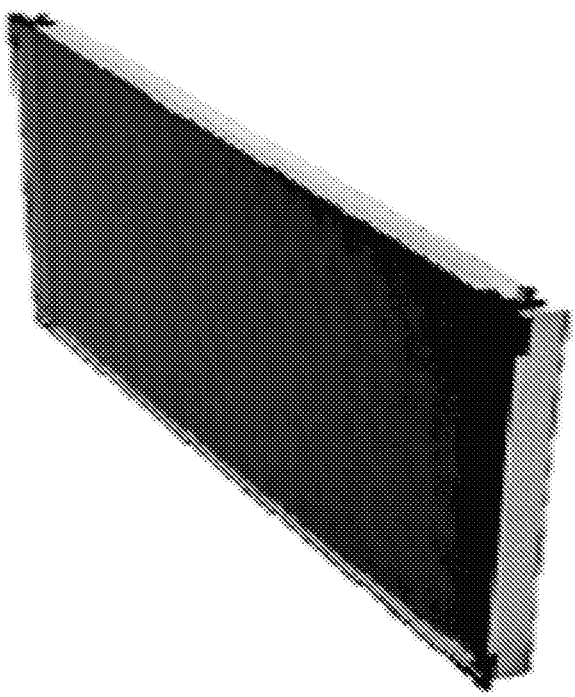

A supplemental heat source is solar heat collection and recovery. FIG. 9 depicts an example of a solar heat collection and recovery device, showing the different laminations including: glass, absorber, insulation, back sheet, riser pip, header pipe, and aluminum rails.

TABLE 1

Dimensions of example solar panel.

| | | |
|---|---|---|
| Length | 1.981 [m] | 6.5 [ft] |
| Width | 1.222 [m] | 4 [ft] |
| Height | 0.080 [m] | 3.15 [in] |
| Gross Area | 2.42 [m²] | 26 [ft²] |

Application of the solar panel includes a similar analysis of constraints. The following assumptions are made: ~90% efficiency, steady-state conditions, and installations on surfaces other than trailer top has negligible benefits.

Design constraint: available surface area on trailer top

Available area=43 m (450 ft^2)

Number of panels=13 Units

Closed loop system

Water is the transfer fluid

Depending on solar heat availability, the solar panel can provide an average of about 9.52 kWh/day.

Solar panel thermal conductance determination:

$$\frac{1}{U} = \frac{1}{h_c} + \frac{1}{h_{glass}} + \frac{x}{k_{abs\,plate}} + \frac{x}{k_{ins}} + \frac{x}{k_{bk\,plate}}$$

$$\frac{1}{U} = \frac{1}{10 \frac{W}{m^2 K}} + \frac{1}{300 \frac{W}{m^2 K}} + \frac{0.05\,m}{0.04 \frac{W}{mK}} + \frac{0.0005\,m}{401 \frac{W}{mK}} + \frac{0.6\,m}{205 \frac{W}{mK}}$$

$$\frac{1}{U} = 1.36 \frac{m^2 K}{W}$$

$$U = 0.7373 \frac{W}{m^2 K}$$

Solar panel heat seepage determination:

$$Q = UA\Delta t$$

$$Q = 0.7373 \frac{W}{m^2 K} * 31.47 \ m^2 * (25 - 18.4)$$

$$Q = 153.1439 [W]$$

Figure 10:
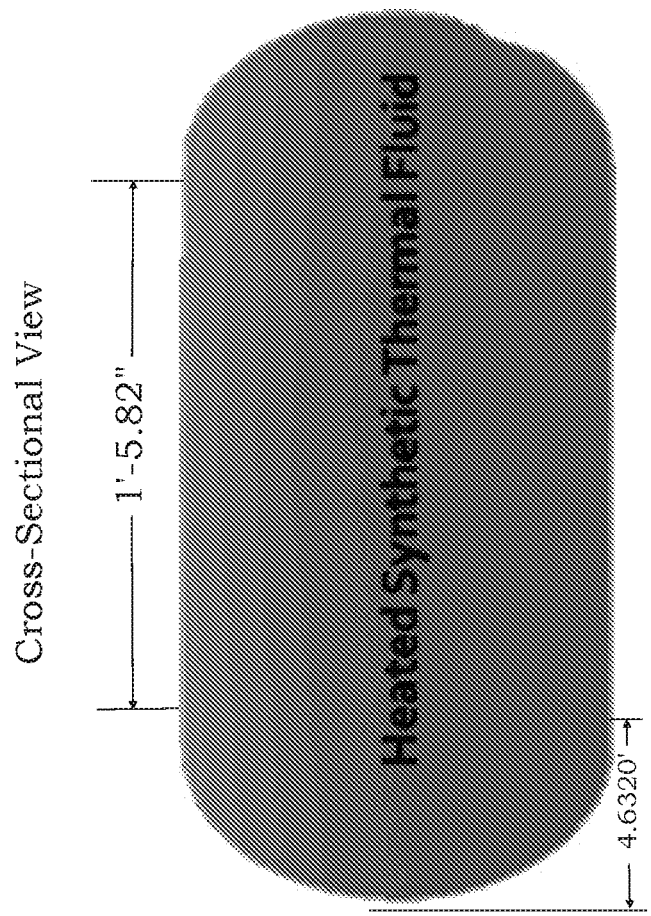
FIG. 10 depicts heat storage unit as a component of the system, according to an embodiment of the claimed subject matter.
Figure 10:
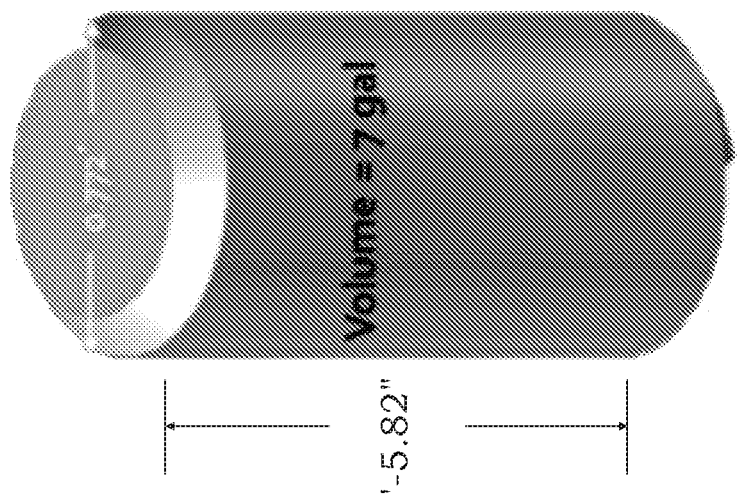

An example of heated synthetic thermal fluid storage is depicted in FIG. 10, showing a cross-section view. In this example, the volume is 7 gallons, with a body of the tank and rounded ends of the tank as depicted. Design of a heat source storage tank follows a similar analysis:

Design Constraint: diameter fixed at 0.772 ft $$V = V_{cylinder} + V_{Sphere} = \pi \left(\frac{d}{2}\right)^2 h + \left(\frac{4}{3}\right)\pi \left(\frac{d}{2}\right)^3 = 0.9362 \ ft^3 \ [7 \text{ gallons}]$$

Ideal Synthetic Thermal Fluid Properties

Specific heat capacity range=41.84 kJ/kg·° C.-62.76 kJ/kg·° C.

Thermal diffusivity range=3000 mm²/s-4000 mm²/s

Density=1200 kg/m³

Thermal conductivity more than 400 times higher than specific heat capacity

The heat storage tank provides power to the system when the truck is powered off. The following analysis discusses maximum backup time of heat storage supply:

Heat Storage Max Temp: 180° C.

Ambient Temp: 25° C.

Volume of Tank: 0.9362 m³

Tank Capacity $$Q = mc_p \Delta t$$

$$Q = 309,048.3 \ KJ$$

Duration before Fail-Safe is needed $$\text{Time} = \frac{\text{Tank Capcity}}{\text{Cooling Load}} = 2.5 \text{ hrs}$$

This fail-safe can be microwave heating (i.e., interaction of microwaves with matter other than metallic conductors will be to rotate molecules and produce heat as result of that molecular motion):

TABLE 2

| Refrigerant R407c | Absorbent Bromobenzene |
|---|---|
| $\epsilon'$ – 32.8 | $\epsilon'$ – 2.0 |
| $\epsilon''$ – 18.2 | $\epsilon''$ – 0.2 |
| $\tan_\sigma = .554$ | $\tan_\sigma = 1$ |
| Estimated run time: 1 hour | |
| 2 kW Magnetron | |

Using R407c and Bromobenzene as refrigerant/absorbent combination, heat energy storage capacities can be ~200 J/g on average. Further, there can be over 200 unique phase change transition temperatures between −40° C. and 151° C., along with consistent, repeatable performance over thousands of thermal (melt/solidify) cycles. The combination is 100% renewable, produced from agricultural sources (not petroleum), and is readily biodegradable and nontoxic.

In a specific example, half-time refrigeration can be achieved by utilizing two generators and two absorbers. One generator and one absorber can generate 2 ToR_not used first time). The second generator and absorber can be used on demand to increase refrigeration.

Figure 11:
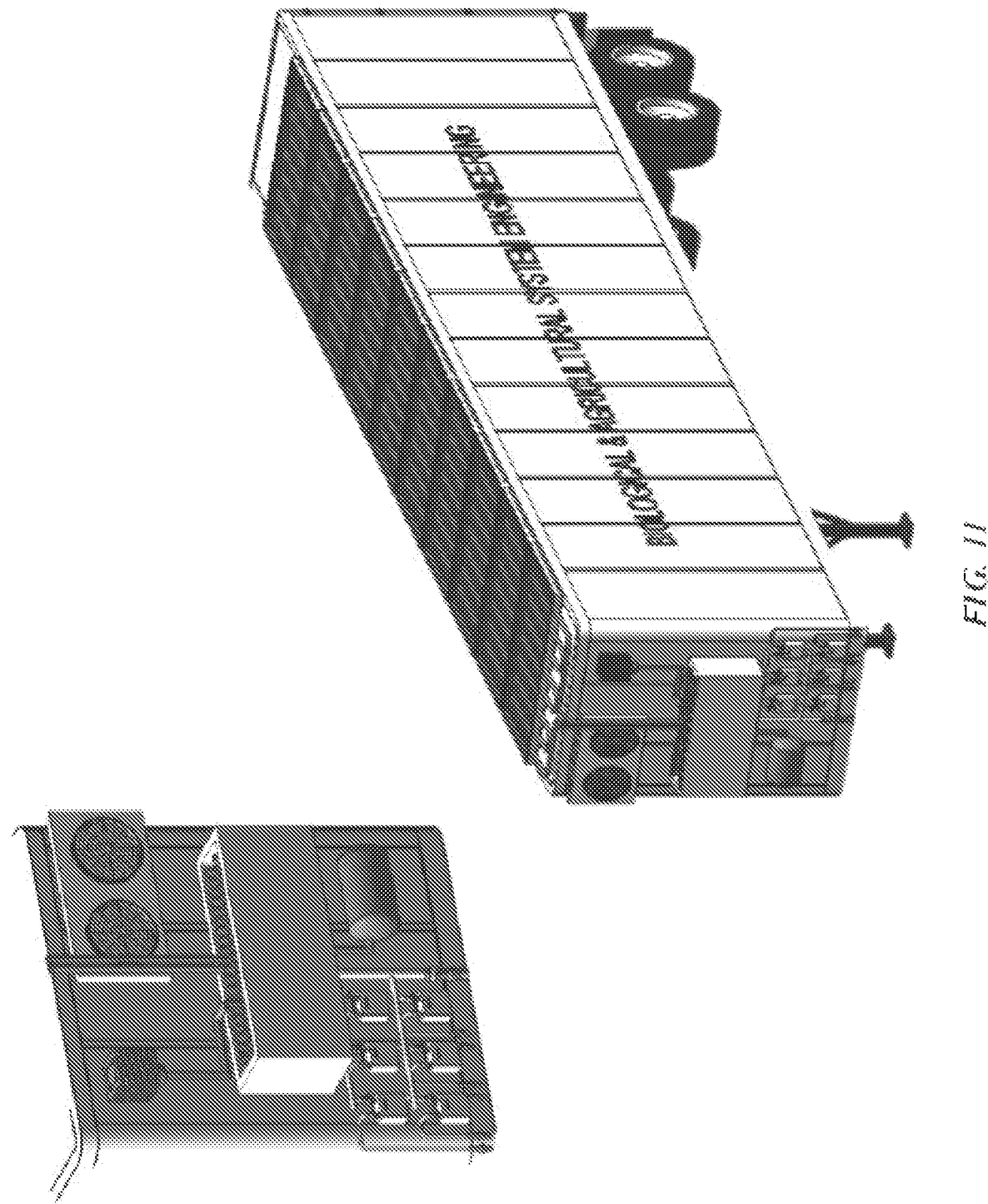
FIG. 11 depicts a microwave radiation heating unit as a component of the system, according to an embodiment of the claimed subject matter.

The device in the claimed subject matter is depicted in FIG. 11 as attached to a semi-truck trailer and in this way a portable system. The system may be larger and still portable if the vehicle it is coupled to is large enough to efficiently support the system. In some instances, the device can be mounted on top of the trailer and the forward end of the trailer just behind the cab of the truck (not depicted).

The advantages set forth above, and those made apparent from the foregoing description, are efficiently attained. While the disclosure is susceptible to various modifications and implementation in alternative forms, specific embodiments have been shown by way of non-limiting example in the drawings and have been described in detail herein. Since certain changes may be made in the above construction without departing from the scope of the instant application, it is intended that all matters contained in the foregoing description or shown in the accompanying drawings shall be interpreted as illustrative and not in a limiting sense.

The disclosure is not intended to be limited to the particular forms disclosed.

Rather, the disclosure is to cover all modifications, equivalents, and alternatives falling within the scope of the disclosure as defined by the following appended claims and their legal equivalents.

Without further elaboration, it is believed that one skilled in the art can use the preceding description to utilize the claimed subject matter to its fullest extent. The examples and embodiments disclosed herein are to be construed as merely illustrative and exemplary and not a limitation of the scope of the claimed subject matter in any way. It will be apparent to those having skill in the art, and having the benefit of this disclosure, that changes may be made to the details of the above-described embodiments without departing from the underlying principles of the disclosure herein.

It is also to be understood that the following claims are intended to cover all of the generic and specific features of the disclosure herein described, and all statements of the scope of the disclosure that, as a matter of language, might be said to fall therebetween.

What is claimed is:
1. A high exergy efficient hybrid solar vapor absorption system, comprising:
an evaporator, the evaporator configured to cause evaporation of at least part of a refrigerant and absorbent solution, and cooling of the refrigerant and absorbent solution;
a condenser in fluid communication with the evaporator, the condenser configured to decrease temperature of a gas contained therein thereby transitioning the gas into a liquid state;
a thermal compressor in fluid communication with the evaporator and the condenser;
wherein the refrigerant and absorbent solution flows throughout the high exergy efficient hybrid solar vapor absorption system including at least the evaporator, the condenser, and the thermal compressor;
an expansion valve coupling together the evaporator and the condenser, wherein the expansion valve directs flow of the refrigerant and absorbent solution from the condenser to the evaporator:
wherein the thermal compressor increases a pressure of the refrigerant and absorbent solution, thereby causing the refrigerant and absorbent solution to flow from the evaporator to the condenser;
wherein the thermal compressor comprises:
a generator ($Q_{in}$) receiving solar energy,
an absorber ($Q_{out}$) in fluid communication with the generator,
a one-way valve disposed between the generator and the absorber configured to allow passage of the refrigerant and absorbent fluid from generator to the absorber, and
a pump ($W_{in}$) in fluid communication with the generator and the absorber, configured to increase the pressure of the refrigerant and absorbent solution moving from the absorber to the generator;
a microwave heat source coupled to the generator, wherein the microwave heat source provides heat to the generator;
an automobile exhaust heat source coupled to a storage unit, wherein the automobile exhaust heat source increases the heat of thermal storage fluid in the system which is stored in a storage unit in fluid communication with the generator; and
solar panels coupled to the storage unit, wherein the solar panels heat the thermal storage fluid.
2. The high exergy efficient hybrid solar vapor absorption system of claim 1, wherein the solar panels are also coupled to the generator, wherein the solar panels provide heat to the generator.
3. The high exergy efficient hybrid solar vapor absorption system of claim 1, wherein the thermal storage fluid is circulated through a vehicle radiator, a vehicle exhaust pipe, a solar collector, or a combination thereof, and is then stored in the storage unit in fluid communication with the generator.
4. The high exergy efficient hybrid solar vapor absorption system of claim 1, wherein the microwave heat source is dielectric volumetric heating using microwaves.
5. The high exergy efficient hybrid solar vapor absorption system of claim 1, wherein the refrigerant and the absorbent are differentially heated.
6. The high exergy efficient hybrid solar vapor absorption system of claim 1, wherein the refrigerant consists of the group selected from: R23; R32; R134a; R404A; R407A; R407C; R407F (PERFORMAX LT); and R410A or a combination thereof.
7. The high exergy efficient hybrid solar vapor absorption system of claim 1, wherein the absorbent is bromobenzene.
8. The high exergy efficient hybrid solar vapor absorption system of claim 1, wherein the ratio of refrigerant to absorbent is 40:60.
9. The high exergy efficient hybrid solar vapor absorption system of claim 1, wherein the high exergy efficient hybrid solar vapor absorption system is portable.
10. The high exergy efficient hybrid solar vapor absorption system of claim 1, wherein the high exergy efficient hybrid solar vapor absorption system achieves at least 0.5 tons of refrigeration.
11. The high exergy efficient hybrid solar vapor absorption system of claim 2, wherein the automobile exhaust is provided by an internal combustion engine.
12. The high exergy efficient hybrid solar vapor absorption system of claim 1, wherein the storage tank volume is at least 7 gallons.
13. The high exergy efficient hybrid solar vapor absorption system of claim 1, further comprising throttle valve configured to cause the refrigerant and absorbent solution to flow from the generator to the absorber.
14. The high exergy efficient hybrid solar vapor absorption system of claim 1, wherein the energy storage capacity is 200 J/g on average.
15. The high exergy efficient hybrid solar vapor absorption system of claim 1, wherein the high exergy efficient hybrid solar vapor absorption system uses at least two generators and at least two absorbers all in fluid communication with each other including the condenser and the evaporator.
16. A method of increasing exergy efficiency in a solar absorption system, comprising:
an evaporator, the evaporator configured to cause evaporation of at least part of a refrigerant and absorbent solution, and cooling of the refrigerant and absorbent solution;
a condenser in fluid communication with the evaporator, the condenser configured to decrease temperature of a gas contained therein thereby transitioning the gas into a liquid state;
a thermal compressor in fluid communication with the evaporator and the condenser;
wherein the refrigerant and absorbent solution flows throughout the high exergy efficient hybrid solar vapor absorption system including at least the evaporator, the condenser, and the thermal compressor;
an expansion valve coupling together the evaporator and the condenser, wherein the expansion valve directs flow of the refrigerant and absorbent solution from the condenser to the evaporator;
wherein the thermal compressor increases a pressure of the refrigerant and absorbent solution, thereby causing the refrigerant and absorbent solution to flow from the evaporator to the condenser;
wherein the thermal compressor comprises:
a generator ($Q_{in}$) receiving solar energy,
an absorber ($Q_{out}$) in fluid communication with the generator,
a one-way valve disposed between the generator and the absorber configured to allow passage of the refrigerant and absorbent fluid from generator to the absorber, and a pump ($W_{in}$) in fluid communication with the generator and the absorber, configured to increase the pressure of the refrigerant and absorbent solution moving from the absorber to the generator;

a microwave heat source coupled to the generator, wherein the microwave heat source provides heat to the generator;

an automobile exhaust heat source coupled to a storage unit, wherein the automobile exhaust heat source increases the heat of thermal fluid in the system which is stored in a storage unit in fluid communication with the generator; and solar panels coupled to the storage unit, wherein the solar panels heat the thermal fluid system.

17. The method of claim 16, wherein the thermal fluid is circulated through a vehicle radiator, a vehicle exhaust pipe, a solar collector, or a combination thereof, and is then stored in the storage unit in fluid communication with the generator.

\* \* \* \* \*